US010216129B2

(12) United States Patent
Qi et al.

(10) Patent No.: US 10,216,129 B2
(45) Date of Patent: Feb. 26, 2019

(54) INTERMEDIATE LAYER COMPRISING CNT POLYMER NANOCOMPOSITE MATERIALS IN FUSERS

(75) Inventors: Yu Qi, Oakville (CA); Nan-Xing Hu, Oakville (CA); David J. Gervasi, Pittsford, NY (US); David C. Irving, Avon, NY (US); Patrick J. Finn, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 1647 days.

(21) Appl. No.: 12/362,182

(22) Filed: Jan. 29, 2009

(65) Prior Publication Data

US 2010/0189943 A1 Jul. 29, 2010

(51) Int. Cl.

*B32B 1/08* (2006.01)
*B32B 9/04* (2006.01)
(Continued)

(52) U.S. Cl.

CPC .... *G03G 15/2057* (2013.01); *Y10T 428/1372* (2015.01); *Y10T 428/25* (2015.01); *Y10T 428/269* (2015.01); *Y10T 428/3154* (2015.04); *Y10T 428/31544* (2015.04); *Y10T 428/31663* (2015.04); *Y10T 428/31721* (2015.04);
(Continued)

(58) Field of Classification Search

CPC ...... C09D 127/12; C09D 127/18; B82Y 5/00; B82Y 30/00; G03G 2215/2048; G03G 15/1685; G03G 15/2057; Y10T 428/1372; Y10T 428/269; Y10T 428/31544; Y10T 428/317721; Y10T 428/31765; G03D 15/2057; B32B 27/34; B32B 27/36;
(Continued)

(56) References Cited

U.S. PATENT DOCUMENTS 4,257,699 A * 3/1981 Lentz ...................... 430/124.33
6,514,650 B1 * 2/2003 Schlueter et al. .............. 430/56
(Continued)

FOREIGN PATENT DOCUMENTS

CN 101299139 11/2008
JP 2003-131510 5/2003
(Continued)

OTHER PUBLICATIONS

European Patent Office, European Search Report, European Patent Application No. 10151367.9-2204, dated May 12, 2010, 6 Pages.
(Continued)

*Primary Examiner* — Camie S Thompson
(74) *Attorney, Agent, or Firm* — MH2 TECHNOLOGY LAW GROUP LLP

(57) ABSTRACT

Exemplary embodiments provide a fuser member containing an intermediate layer and methods for forming the intermediate layer and the fuser member. In one embodiment, the fuser member can include a substrate, a resilient layer, a surface layer and an intermediate layer disposed between the resilient layer (e.g., a silicone rubber layer) and the surface layer (e.g., a fluoroplastic of PFA or PTEE). The intermediate layer can include a CNT/polymer composite containing a plurality of carbon nanotubes in a polymer matrix. The surface layer and the fuser member can thus be treated at a temperature of about 250° C. or higher.

13 Claims, 2 Drawing Sheets

(51) Int. Cl.

| | |
|---|---|
| ***B32B 27/06*** | (2006.01) |
| ***B32B 27/34*** | (2006.01) |
| ***B32B 27/36*** | (2006.01) |
| ***B32B 27/00*** | (2006.01) |
| ***B32B 5/16*** | (2006.01) |
| ***B32B 3/02*** | (2006.01) |
| ***G03G 15/20*** | (2006.01) |

(52) U.S. Cl.
CPC .................. *Y10T 428/31765* (2015.04); *Y10T 428/31786* (2015.04)

(58) Field of Classification Search
CPC .. B32B 27/00; B32B 1/08; B32B 9/04; B32B 5/16; B32B 3/02
USPC ........ 977/750, 752; 428/323, 339, 421, 422, 428/473.5, 477.7, 36.4
See application file for complete search history.

(56) References Cited

U.S. PATENT DOCUMENTS

| | | | | |
|---|---|---|---|---|
| 7,734,241 | B2 | 6/2010 | Nishida et al. | |
| 8,231,972 | B2 * | 7/2012 | Moorlag et al. | 428/421 |
| 2006/0292360 | A1 * | 12/2006 | Hays et al. | 428/323 |
| 2007/0298217 | A1 * | 12/2007 | Chen | G03G 15/2057 428/141 |
| 2008/0152896 | A1 * | 6/2008 | Moorlag et al. | 428/323 |
| 2009/0245840 | A1 * | 10/2009 | Law | 399/69 |
| 2010/0055450 | A1 * | 3/2010 | Qi et al. | 428/336 |
| 2010/0190100 | A1 * | 7/2010 | Kelly et al. | 430/84 |

FOREIGN PATENT DOCUMENTS

| | | | |
|---|---|---|---|
| JP | 2007101736 | | 4/2007 |
| JP | 2007-179009 | * | 7/2007 |
| JP | 2007179009 | | 7/2007 |
| JP | 2007304374 | | 11/2007 |
| JP | 2008-155210 | | 7/2008 |
| JP | 2008165024 | | 7/2008 |
| JP | 5178290 | | 12/2008 |
| JP | 2008299314 | | 12/2008 |
| KR | 100935486 | | 11/2008 |

OTHER PUBLICATIONS

W. Dasilva et al., "Adhesion of Copper to Teflon® poly(tetrafluoroethylene-co-perfluoropropyl vinyl ether) (PFA) Surfaces Modified by Vacuum UV Photo-oxidation Downstream from Argon Microwave Plasma" (abstract), 2004 MRS Fall Meeting, MRS Proceedings, vol. 851, 2004, 1 page.
Author Unknown, "Perfluoroalkoxy of PFA", Poly Plast Chemi Plants (I) Pvt. Ltd., http://www.fluoropolymers.net/per-fluoro-alkoxy.html, accessed Sep. 3, 2014, pp. 1-2.
Author Unknown, Elastomer, Wikipedia, http://en.wikipedia.org/wiki/Elastomer, accessed Jul. 25, 2014, pp. 1-3.
Author Unknown, Viton® fluoroelastomer, Processing Guide, DuPont Dow elastomers, Jul. 2003, pp. 1-24.

* cited by examiner

INTERMEDIATE LAYER COMPRISING CNT POLYMER NANOCOMPOSITE MATERIALS IN FUSERS

DESCRIPTION OF THE INVENTION

Field of the Invention

This invention relates generally to an intermediate layer and, more particularly, to a nanotube-containing intermediate layer and related members used for electrostatographic devices, and methods for making the nanotube-containing intermediate layer and the related members.

Background of the Invention

In electrophotography (also known as xerography, electrophotographic imaging or electrostatographic imaging), an imaging process includes forming a visible toner image on a support surface (e.g., a sheet of paper). The visible toner image is often transferred from a photoreceptor that contains an electrostatic latent image and is usually fixed or fused onto a support surface to form a permanent image using a fuser. For example, the fuser can include a surface release layer made of fluoroplastics (e.g., perfluoroalkoxy (PFA), or polytetrafluoroethylene (PTFE)) and coated on a resilient silicone rubber layer. The fluoroplastic surface can enable oil-less fusing and the conformable silicone rubber layer can enable rough paper fix, low mottle and good uniformity. In some fusers, primer layers, such as tie layers, have been used between the silicone rubber layer and the surface release layer to facilitate the adhesion therebetween.

The fluoroplastics are often crystalline materials and require high baking temperatures, typically over 300° C., to form films. Problems arise, however, since the silicone rubber starts to degrade at about 250° C. It is therefore difficult to achieve uniform fuser films without defects, even if the formation process conditions, such as the baking temperatures, the ramping temperatures and primer layer types and thickness can be tuned as desired.

Thus, there is a need to overcome these and other problems of the prior art and to provide an intermediate composite layer in a fuser member and methods for forming the intermediate composite layer and the fuser member.

SUMMARY OF THE INVENTION

According to various embodiments, the present teachings include a fuser member. The fuser member can include a substrate; a resilient layer disposed over the substrate; an intermediate layer disposed over the resilient layer, and a surface layer disposed over the intermediate layer. The intermediate layer of the fuser member can include a plurality of carbon nanotubes dispersed in a polymer matrix to protect the underlying resilient layer.

According to various embodiments, the present teachings also include a method for making a member. In this method, a composite dispersion that include a plurality of carbon nanotubes and a polymer can be formed and then deposited and cured on a resilient layer to form an intermediate layer thereon. The resilient layer can be formed over a substrate. A second dispersion can be applied to the formed intermediate layer and can be treated at a temperature of about 250° C. or higher to form a surface layer on the intermediate layer.

According to various embodiments, the present teachings further include a method for forming a member. During the formation, a composite dispersion that includes a plurality of carbon nanotubes and a polymer can be formed and deposited on a resilient layer, which is formed on a substrate. A second dispersion can then be applied to the deposited composite dispersion and can be treated at a temperature of about 250° C. or higher to form an intermediate layer on the resilient layer and to form a surface layer on the formed intermediate layer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
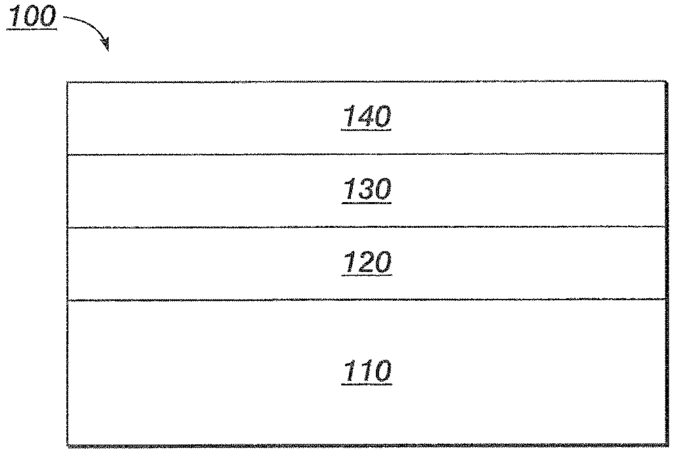
FIG. 1 depicts a portion of an exemplary fuser member in accordance with the present teachings.

Reference will now be made in detail to the present embodiments (exemplary embodiments) of the invention, an example of which is illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms “including”, “includes”, “having”, “has”, “with”, or variants thereof are used in either the detailed description and the claims, such terms are intended to be inclusive in a manner similar to the term “comprising.” As used herein, the term “one or more of” with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Exemplary embodiments provide a fuser member containing an intermediate layer and methods for forming the intermediate layer and the fuser member. In one embodiment, the fuser member can include a substrate, a resilient layer, a surface layer and an intermediate layer disposed between the resilient layer and the surface layer. The resilient layer can include, for example, a silicone rubber layer and the surface layer can include, for example, a fluoropolymer such as a fluoroplastic of PFA or PTFE. The intermediate layer can include a carbon-nanotube (CNT) polymer composite containing a plurality of carbon nanotubes in a polymer matrix. The surface layer and the fuser member can thus be treated at a temperature of about 250° C. or higher.

Although the term "fuser member" is used herein for illustrative purposes, it is intended that the term "fuser member" also encompasses other members useful for an electrostatographic printing process including, but not limited to, a fixing member, a pressure member, a heat member and/or a donor member. The "fuser member" can be in a form of, for example, a belt, a plate, a sheet, a roll or the like.

FIG. 1 depicts a portion of an exemplary fuser member 100 in accordance with the present teachings. It should be readily apparent to one of ordinary skill in the art that the member 100 depicted in FIG. 1 represents a generalized schematic illustration and that other components/layers/films/particles can be added or existing components/layers/films/particles can be removed or modified.

As shown, the fuser member 100 can include a substrate 110, a resilient layer 120, an intermediate layer 130 and a surface layer 140. The surface layer 140 can be formed over the resilient layer 120, which can in turn be formed over the substrate 110. The disclosed intermediate layer 130 can be formed between the resilient layer 120 and the surface layer 140 in order to provide desired properties, e.g., thermal stabilities, for forming and/or using the fuser member 100 at a temperature of about 250° C. or higher.

The substrate 110 can be in a form of, for example, a belt, plate, and/or cylindrical drum for the disclosed fuser member 100. In various embodiments, the substrate 110 can include a wide variety of materials, such as, for example, metals, metal alloys, rubbers, glass, ceramics, plastics, or fabrics. In an additional example, the metals used can include aluminum, anodized aluminum, steel, nickel, copper, and mixtures thereof, while the plastics used can include polyimides, polyester, polyetheretherketone (PEEK), poly (arylene ether)s, polyamides and mixtures thereof. In certain embodiments, the substrate 110 can include, e.g., aluminum cylinders or aluminum fuser rolls having silicone rubber formed thereon.

The resilient layer 120 can include, for example, a silicone rubber layer; and the surface layer 140 can include, for example, fluoroplastics such as PFA, and/or PTFE, depending on specific applications. In various embodiments, materials and/or methods as known to one of ordinary skill in the art for the resilient layer and/or the surface layer of a conventional fuser member can be used for the disclosed fuser member 100. In various embodiments, the surface layer 140 can include a fluoropolymer including, but not limited to, polytetrafluoroethylene, copolymer of tetrafluoroethylene and hexafluoropropylene, copolymer of tetrafluoroethylene and perfluoro(propyl vinyl ether), copolymer of tetrafluoroethylene and perfluoro(ethyl vinyl ether), copolymer of tetrafluoroethylene and perfluoro(methyl vinyl ether), and copolymer of tetrafluoroethylene, hexafluoropropylene and vinylidenefluoride.

The intermediate layer 130 can be formed between the resilient layer 120 and the surface layer 140 so as to facilitate the film quality of the resilient layer 120 and/or the surface layer 140 and/or to facilitate the adhesion therebetween. In various embodiments, the intermediate layer 130 can include a plurality of carbon nanotubes (CNTs) dispersed in a polymer matrix to provide an improved thermal stability, mechanical robustness, and/or electrical property of the fuser member 100. In various embodiments, the intermediate layer 130 can thermally and/or mechanically protect the resilient layer 120 during the formation and/or use of the member 100. For example, when the member 100, such as the surface layer 140 that is formed over the intermediate layer 130, is treated at a temperature of about 250° C. or high, defect formation can be reduced and eliminated for the resilient layer 130 due to the overlaying intermediate layer 130.

As used herein, the "polymer matrix" can include one or more chemically or physically cross-linked polymers, such as, for example, thermoplastics, thermoelastomers, resins, polyperfluoroether elastomers, silicone elastomers, thermosetting polymers or other cross-linked materials. In various other embodiments, the polymers can include, for example, fluorinated polymers (i.e., fluoropolymers) including, but not limited to, fluoroelastomers (e.g. Viton), fluorinated thermoplastics including fluorinated polyethers, fluorinated polyimides, fluorinated polyetherketones, fluorinated polyamides, or fluorinated polyesters. In various embodiments, the one or more cross-linked polymers can be semi-soft and/or molten to mix with the nanotubes.

In various embodiments, the polymer matrix can include fluoroelastomers, e.g., having a monomeric repeat unit selected from the group consisting of tetrafluoroethylene, perfluoro(methyl vinyl ether), perfluoro(propyl vinyl ether), perfluoro(ethyl vinyl ether), vinylidene fluoride, hexafluoropropylene, and mixtures thereof.

Commercially available fluoroelastomer can include, for example, such as Viton A® (copolymers of hexafluoropropylene (HFP) and vinylidene fluoride (VDF or VF2)), Viton®-B, (terpolymers of tetrafluoroethylene (TFE), vinylidene fluoride (VDF) and hexafluoropropylene (HFP); and Viton®-GF, (tetrapolymers including TFE, VF2, HFP)), as well as Viton E®, Viton E 60C®, Viton E430®, Viton 910®, Viton GH® and Viton GF®. The Viton designations are Trademarks of E.I. DuPont de Nemours, Inc. Still other commercially available fluoroelastomer can include, for example, Dyneon™ fluoroelastomers from 3M Company. Additional commercially available materials can include Aflas® a poly(propylene-tetrafluoroethylene) and Fluorel II® (LII900) a poly(propylene-tetrafluoroethylenevinylidenefluoride) both also available from 3M Company, as well as the Tecnoflons identified as For-60KIR®, For-LHF®, NM®, For-THF®, For-TFS®, TH®, and TN505®, available from Solvay Solexis.

In one embodiment, the polymer matrix can include a vinylidenefluoride-containing fluoroelastomer cross-linked with an effective curing agent (also referred to herein as a cross-linking agent, bonding agent, or cross-linker), that includes, but is not limited to, a bisphenol compound, a diamino compound, an aminophenol compound, an amino-siloxane compound, an amino-silane and a phenol-silane compound.

An exemplary bisphenol cross-linker can include Viton® Curative No. 50 (VC-50) available from E. I. du Pont de Nemours, Inc. VC-50 can be soluble in a solvent suspension of the CNT and the exemplary fluoropolymer and can be readily available at the reactive sites for cross-linking. Curative VC-50 can contain Bisphenol-AF as a cross-linker and diphenylbenzylphosphonium chloride as an accelerator. Bisphenol-AF is also known as 4,4'-(hexafluoroisopropylidene)diphenol.

Cross-linked fluoropolymers can form elastomers that are relatively soft and display elastic properties. In a specific embodiment, the polymer matrix used for the intermediate layer can include Viton-GF® (E. I. du Pont de Nemours, Inc.), including tetrafluoroethylene (TFE), hexafluoropropylene (HFP), vinylidene fluoride (VF2), and a brominated peroxide cure site.

In various embodiments, the polymer matrix for the intermediate layer 130 can include a fluororesin including, but not limited to, polytetrafluoroethylene, copolymer of tetrafluoroethylene and hexafluoropropylene, copolymer of tetrafluoroethylene and perfluoro(propyl vinyl ether), copolymer of tetrafluoroethylene and perfluoro(ethyl vinyl ether), and copolymer of tetrafluoroethylene and perfluoro(methyl vinyl ether). In various embodiments, the polymer matrix can include cured silicone elastomers.

In various embodiments, the polymers and the nanotubes used for the intermediate layer 130 can include those described in related U.S. patent application Ser. No. 12/198,551, entitled "A Process for Making CNT/PFA Composite Coatings for Fuser Applications;" Ser. No. 12/198,460, entitled "CNT/Fluoropolymer Coating Composition;" and Ser. No. 12/245,850, entitled "Nanotube Reinforced Fluorine-Containing Composites," which are hereby incorporated by reference in their entirety.

As used herein and unless otherwise specified, the term "nanotubes" refers to elongated materials (including organic and inorganic materials) having at least one minor dimension, for example, width or diameter, of about 100 nanometers or less. Although the term "nanotubes" is used herein for illustrative purposes, it is intended that the term also encompasses other elongated structures of like dimensions including, but not limited to, nanoshafts, nanopillars, nanowires, nanorods, and nanoneedles and their various functionalized and derivatized fibril forms, which include nanofibers with exemplary forms of thread, yarn, fabrics, etc.

The nanotubes can also include single wall carbon nanotubes (SWCNTs), multi-wall carbon nanotubes (MWCNTs), and their various functionalized and derivatized fibril forms such as carbon nanofibers. In various embodiments, the nanotubes can have an inside diameter and an outside diameter. For example, the inside diameter can range from about 0.5 to about 20 nanometers, while the outside diameter can range from about 1 to about 80 nanometers. Alternatively, the nanotubes can have an aspect ratio, e.g., ranging from about 1 to about 1,000,000.

The nanotubes can have various cross sectional shapes, such as, for example, rectangular, polygonal, oval, or circular shape. Accordingly, the nanotubes can have, for example, cylindrical 3-dimensional shapes.

The nanotubes can be formed of conductive or semi-conductive materials and can provide exceptional and desired functions, such as, thermal (e.g., stability or conductivity), mechanical, and electrical (e.g., conductivity) functions. In addition, the nanotubes can be modified/functionalized nanotubes with controlled and/or increased thermal, mechanical, and electrical properties through various physical and/or chemical modifications. For example, carbon nanotubes can be surface-modified with a material chosen from perfluorocarbon, perfluoropolyether, and/or polydimethylsiloxane.

The nanotubes can further be dispersed in the polymer matrix having a weight loading of, for example, about 0.01% to about 20% of the formed intermediate layer 130.

In various embodiments, the intermediate layer 130 can further include fillers, such as inorganic particles, in the nanotube composite dispersion. In an exemplary embodiment, the filler suspension can be prepared by sonication of inorganic particles in the presents of surface treatment agents such as silanes in water. In various embodiments, the inorganic particles can include, but are not limited to, metal oxides, non-metal oxides, metals, or other suitable particles. Specifically, the metal oxides can include, for example, silicon oxide, aluminum oxide, chromium oxide, zirconium oxide, zinc oxide, tin oxide, iron oxide, magnesium oxide, manganese oxide, nickel oxide, copper oxide, antimony pentoxide, indium tin oxide, and mixtures thereof. The non-metal oxides can include, for example, boron nitride, silicon carbides (SiC) and the like. The metals can include, for example, nickel, copper, silver, gold, zinc, iron and the like. In various embodiments, other additives known to one of ordinary skill in the art can also be included in the nanotube coating composites.

Figure 1A:
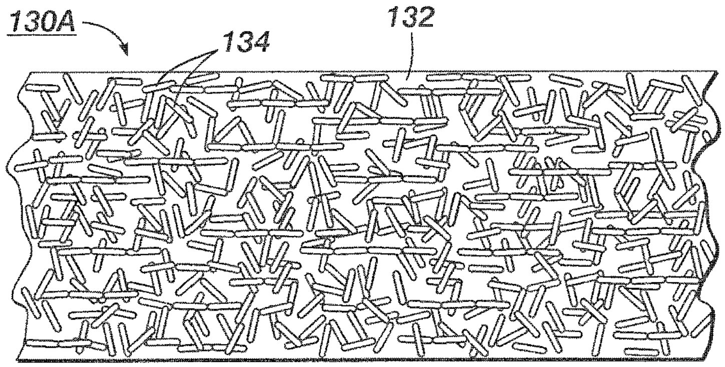
FIGS. 1A-1B are schematics showing exemplary intermediate layers used for the fuser member in FIG. 1 in accordance with the present teachings.
Figure 1B:
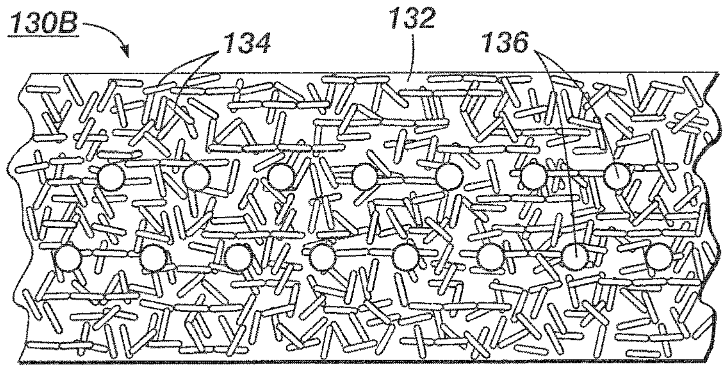

FIGS. 1A-1B are schematics showing exemplary intermediate layers 130A-130B used for the fuser member in FIG. 1 in accordance with the present teachings. As shown in FIGS. 1A-1B, although the plurality of nanotubes 134 is depicted having a consistent size, one of ordinary skill in the art will understand that the plurality of nanotubes 134 can have different sizes, for example, different lengths, widths and/or diameters. In addition, it should be readily apparent to one of ordinary skill in the art that the intermediate layer depicted in FIGS. 1A-1B represents a generalized schematic illustration and that other nanotubes/fillers/layers can be added or existing nanotubes/fillers/layers can be removed or modified.

In FIG. 1A, the plurality of CNTs 134 can be dispersed within an exemplary polymer matrix 132. In this illustrated embodiment, the CNT distribution can include bundled carbon nanotubes 134 dispersed uniformly but with random tangles throughout the polymer matrix 132 of the intermediate layer 130A. In various embodiments, the plurality of carbon nanotubes 134 can be dispersed uniformly and spatially-controlled, for example, be aligned or oriented at certain directions, throughout the polymer matrix 132 of the intermediate layer 130A by, for example, use of a magnetic field.

In FIG. 1B, the intermediate layer 130B can further include a plurality of fillers 136 along with the plurality of carbon nanotubes 134 dispersed in the polymer matrix 132. As disclosed herein, the plurality of fillers 136 can include, such as, for example, aluminum oxide, chromium oxide, zirconium oxide, zinc oxide, tin oxide, iron oxide, magnesium oxide, manganese oxide, nickel oxide, copper oxide, antimony pentoxide, indium tin oxide, boron nitride, silicon carbides, nickel, copper, silver, gold, zinc, or iron.

In various embodiments, a CNT/polymer composite dispersion can be used to form the disclosed intermediate layer 130. The composite dispersion can be prepared to include, for example, an effective solvent in order to disperse the plurality of CNTs, one or more polymers and/or corresponding curing agents; inorganic filler particles and optionally surfactants that are known to one of the ordinary skill in the art.

Effective solvents can include, but are not limited to, methyl isobutyl ketone (MIBK), acetone, methyl ethyl ketone (MEK), and mixtures thereof. Other solvents that can form suitable dispersions can be within the scope of the embodiments herein.

Various embodiments can thus include methods for forming the fuser member 100 in accordance with the present teachings. During the formation, various layer-forming techniques, such as, for example, coating techniques, extrusion techniques and/or molding techniques, can be applied respectively to the substrate 110 to form the resilient layer 120, to the resilient layer 120 to form the intermediate layer 130, and/or to the intermediate layer 130 to form the surface layer 140.

As used herein, the term “coating technique” refers to a technique or a process for applying, forming, or depositing a dispersion to a material or a surface. Therefore, the term “coating” or “coating technique” is not particularly limited in the present teachings, and dip coating, painting, brush coating, roller coating, pad application, spray coating, spin coating, casting, or flow coating can be employed. For example, the composite dispersion for forming the intermediate layer 130 and a second dispersion for forming the surface layer 140 can be respectively coated on the resilient layer 120 and the formed intermediate layer 130 by spray-coating with an air-brush. In various embodiments, gap coating can be used to coat a flat substrate, such as a belt or plate, whereas flow coating can be used to coat a cylindrical substrate, such as a drum or fuser roll or fuser member substrate.

In various embodiments, the disclosed the fuser member can include an intermediate layer having a thickness of about 0.1 micrometer to about 50 micrometers; a surface layer having a thickness of about 1 micrometer to about 40 micrometers; and a resilient layer having a thickness of about 2 micrometers to about 10 millimeters.

Figure 2:
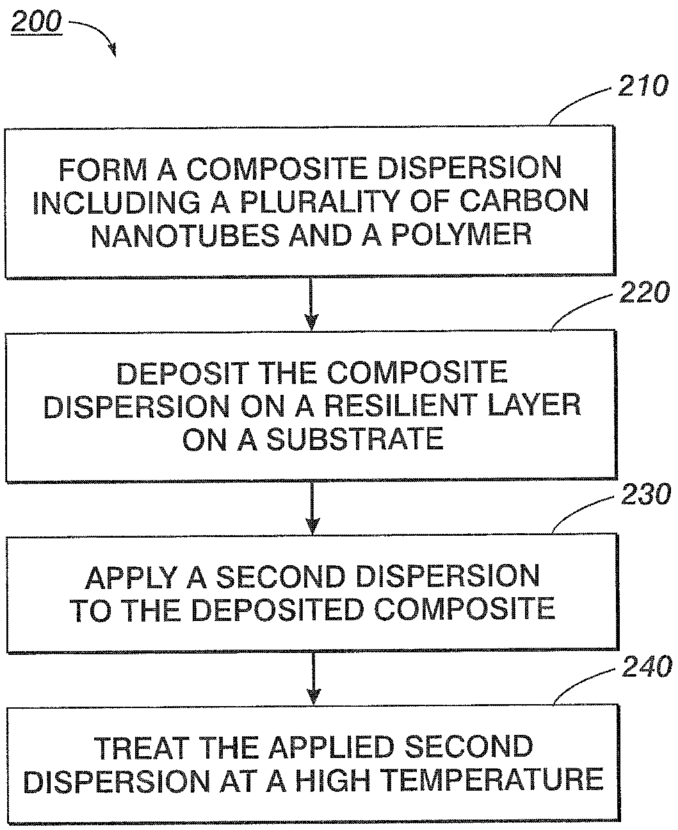
FIG. 2 depicts an exemplary method for forming the fuser member of FIG. 1 in accordance with the present teachings.

FIG. 2 depicts an exemplary method 200 for forming the fuser member 100 of FIG. 1 in accordance with the present teachings. While the method 200 of FIG. 2 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein. Also, not all illustrated steps may be required to implement a methodology in accordance with one or more aspects or embodiments of the present invention. Further, one or more of the acts depicted herein may be carried out in one or more separate acts and/or phases.

At 210 of FIG. 2, a composite dispersion that includes a plurality of carbon nanotubes and a polymer can be formed. For example, the composite dispersion can include a fluoropolymer (e.g., Viton), CNTs, inorganic fillers (e.g., MgO), curing agents (e.g., VC-50), and optionally a surfactant in an organic solvent (e.g., MIBK). In various embodiments, the composite dispersion can include CNT/Viton composites from a let-down process, metal oxide fillers, a bisphenol curing agent VC-50 and optionally a surfactant in an organic solvent. The let-down CNT/Viton composites can be prepared according to related U.S. patent application Ser. No. 12/245,850, entitled “Nanotube Reinforced Fluorine-Containing Composites,” which is hereby incorporated by reference in its entirety.

At 220, the CNT/polymer composite dispersion can be deposited, coated, or extruded on a resilient layer. In various embodiments, the resilient layer (also see 120 of FIG. 1) can be formed on a substrate (also see 110 of FIG. 1) of a conventional fuser member and can be formed by, e.g., molding an exemplary silicone rubber on the substrate. The CNT/polymer composite dispersion can then be, for example, flow-coated on the exemplary silicone rubber layer and can be partially or wholly evaporated for a time length followed by a curing process to form the intermediate layer (also see 130 of FIG. 1). The curing process can be determined by the polymer(s) and the curing agent(s) used.

The curing process for forming the intermediate layer 130 can include, for example, a step-wise curing process. In an exemplary embodiment, a coated/extruded/molded CNT/polymer composite dispersion can be placed in a convection oven at about 49° C. for about 2 hours; the temperature can be increased to about 177° C. and further curing can take place for about 2 hours; the temperature can be increased to about 204° C. and the coating can further be cured at that temperature for about 2 hours; and lastly, the oven temperature can be increased to about 232° C. and the coating can be cured for another 6 hours. Other curing schedules can be possible. Curing schedules known to those skilled in the art can be within the scope of embodiments herein.

At 230, a surface layer (also see 140 of FIG. 1) can be formed by applying a second dispersion to the deposited and/or cured CNT/polymer composite, followed by a thermal treatment at 240 of FIG. 2. For example, following the curing process for forming the intermediate layer, fluoroplastics dispersions prepared from PFA can be deposited onto the formed intermediate layer, for example, by spray- or powder-coating techniques. The surface layer deposition can then be baked at high temperatures of about 250° C. or higher, such as, for example, from about 350° C. to about 360° C.

In various embodiments, during the preparation of the intermediate layer 130, for example, at act 220 of FIG. 2, the solvent system or the dispersion system of the CNT/polymer composite, and/or the residence time of the deposition on the underlying resilient layer 120 can be controlled to achieve high deposition quality for the intermediate layer 130 and to obtain interfacial adhesion between layers of the fuser member 100.

In various embodiments, when preparing the intermediate layer 130 and the surface layer 140 over the resilient layer 120, the baking (or curing) process of the intermediate layer 130 and the surface layer 140 can be combined. For example, after the deposition of the CNT/polymer composite dispersion on the resilient layer 120, the composite deposition can be briefly dried, e.g., to evaporate the solvent used, followed by a deposition of the surface layer 140. The dried deposition of the intermediate composite and the deposition of the surface layer can then be thermally treated to further cure the polymer matrix of the intermediate composite and to further bake the surface layer at the same time. In various embodiments, a step-wise thermal treatment, for example, at temperatures of about 250° C. or higher, can be employed to form the disclose fuser member 100.

In this manner, because the intermediate layer 130 can provide high-temperature thermal stabilities and mechanical robustness, the high temperature baking or curing of the surface layer 140 can be performed to provide high quality to the fuser member 100, for example, without generating any defects within the underlying resilient layer 120 and the formed surface layer 140. In addition, due to the intermediate layer 130, the fuser member 100 can possess, for example, improved adhesion between layers, stability of depositions, improved thermal conductivities, and a long lifetime.

EXAMPLES

Example 1—Preparation of an Intermediate Layer Containing CNT/Viton Composite The intermediate layer was prepared by flow-coating a composite dispersion on a silicone rubber layer of a conventional fuser roll. The composite dispersion included CNT/Viton composites from a let-down process, a metal oxide of MgO, a bisphenol curing agent of VC-50 (Viton® Curative No. 50 available from E. I. du Pont de Nemours, Inc.) and optionally a surfactant in an organic solvent of methyl isobutyl ketone (MIBK).

Following the coating process of the composite deposition, a curing process was performed at ramp temperatures of about 149° C. for about 2 hours, and at about 177° C. for about 2 hours, then at about 204° C. for about 2 hours and then at about 232° C. for about 6 hours for a post cure.

Example 2—Preparation of an Intermediate Layer Containing CNT/Viton Composite In this example, the intermediate coat was prepared by flow-coating a composite dispersion containing the let-down CNT/Viton composites of Example 1, a metal oxide of MgO, an amino-silane curing agent of AO700 and optionally a surfactant in a MIBK organic solvent, on the top of the silicone layer of the fuser roll.

Following the coating process, a curing process was performed at ramp temperatures of about 149° C. for about 2 hours, and at about 177° C. for about 2 hours, then at about 204° C. for about 2 hours and then at about 232° C. for about 6 hours for a post cure.

Example 3—Preparation of Surface Layer of a Fuser Member

The PFA topcoat was used as a surface layer and was prepared by spray-coating a PFA aqueous dispersion on top of the intermediate layer formed in Examples 1-2, followed by baking at high temperature of about 350° C. for 10 min.

Example 4—Preparation of Surface Layer of a Fuser Member

The PFA topcoat was also used as a surface layer and was prepared by powder-coating a PFA aqueous dispersion on top of the intermediate layer formed in Examples 1-2, followed by baking at high temperature of about 350° C. for 10 min.

Example 5—Preparation of a Fuser Member Using a Combined Thermal Treatment

The fuser member was fabricated by flow-coating the CNT/Viton composite dispersion in Examples 1-2 on top of a silicone rubber layer of a conventional fuser member. The coated CNT/Viton composite dispersion was briefly dried at a temperature from about 49° C. to about 177° C. for 2 hours. A PFA layer was then coated on top of the dried composite dispersion using the spray- or powder-coating technique in Examples 3-4, followed by baking at high temperatures of about 204° C. for 2 hours, then about 232° C. for 6 hours, and then about 350° C. for 10 min for a further curing of the intermediate composite and a baking of the PFA surface layer to form the fuser member.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fuser member comprising:

a substrate;

a resilient layer comprising silicone rubber disposed over the substrate;

an intermediate layer disposed over the resilient layer, wherein the intermediate layer comprises a plurality of carbon nanotubes dispersed in a polymer matrix, wherein the polymer matrix comprises a vinylidene fluoride-containing fluoroelastomer cross-linked with a curing agent that is selected from a group consisting of a bisphenol compound, a diamino compound, an aminophenol compound, an amino-siloxane compound, an amino-silane and phenol-silane compound; and a surface layer disposed directly on the intermediate layer, the surface layer being different from the intermediate layer and comprising a perfluoroalkoxy fluoroplastic having a crystalline structure, wherein the intermediate layer is capable of reducing degradation of the resilient layer during the curing compared to the amount of degradation that would otherwise occur if the intermediate layer was not disposed over the resilient layer, wherein the intermediate layer further comprises one or more filler particles comprising metal oxides, silicon carbides, boron nitrides, and graphites, wherein the metal oxides are selected from the group consisting of silicon oxide, aluminum oxide, zirconium oxide, zinc oxide, tin oxide, iron oxide, magnesium oxide, manganese oxide, nickel oxide, copper oxide, antimony pentoxide, indium tin oxide, and mixtures thereof;

wherein the plurality of carbon nanotubes are present in an amount from about 0.01 percent to about 20 percent by weight of the intermediate layer, and wherein the perfluoroalkoxy fluoroplastic is selected from the group consisting of (a) a copolymer of tetrafluoroethylene and perfluoro(propyl vinyl ether), (b) a copolymer of tetrafluoroethylene and a perfluoro(ethyl vinyl ether) and (c) a copolymer of tetrafluoroethylene and perfluoro(methyl vinyl ether).

2. The member of claim 1, wherein each of the plurality of carbon nanotubes comprises a single wall carbon nanotube (SWCNT) or a multi-wall carbon nanotube (MWCNT).

3. The member of claim 1, wherein each of the plurality of carbon nanotubes has an inside diameter ranging from about 0.5 nanometers to about 20 nanometers; an outside diameter ranging from about 1 nanometer to about 80 nanometers; and an aspect ratio ranging from about 1 to about 1,000,000.

4. The member of claim 1, wherein the substrate is formed of a material selected from the group consisting of metals, plastics, and ceramics, wherein the metals are selected from the group consisting of aluminum, anodized aluminum, steel, nickel, copper, and mixtures thereof, and wherein the plastics are selected from the group consisting of polyimides, polyester, polyetheretherketone (PEEK), poly(arylene ether)s, polyamides and mixtures thereof.

5. The member of claim 1, wherein the substrate is in a form of a cylinder, a belt or a sheet.

6. The member of claim 1, wherein the intermediate layer has a thickness ranging from about 0.1 micrometer to about 50 micrometers; the surface layer has a thickness ranging from about 1 micrometer to about 40 micrometers; and the resilient layer has a thickness ranging from about 2 micrometers to about 10 millimeters.

7. The member of claim 1, further comprising a fixing member, a pressure member, or a heat member that is in a form of a belt, a plate, or a roll used in an electrostatographic printing device.

8. A fuser member comprising:

a substrate;

a resilient layer comprising silicone rubber disposed over the substrate;

an intermediate layer disposed over the resilient layer, wherein the intermediate layer comprises a plurality of carbon nanotubes dispersed in a polymer matrix, wherein the polymer matrix is a cross-linked fluoroelastomer; and a surface layer disposed directly on the intermediate layer, the surface layer being different from the intermediate layer and comprising a fluoropolymer having a crystalline structure formable by curing at a temperature of 300° C. or more, wherein the intermediate layer is capable of reducing degradation of the resilient layer during the curing compared to the amount of degradation that would otherwise occur if the intermediate layer was not disposed over the resilient layer, wherein the intermediate layer further comprises one or more filler particles comprising metal oxides, silicon carbides, boron nitrides, and graphites, wherein the metal oxides are selected from the group consisting of silicon oxide, aluminum oxide, zirconium oxide, zinc oxide, tin oxide, iron oxide, magnesium oxide, manganese oxide, nickel oxide, copper oxide, antimony pentoxide, indium tin oxide, and mixtures thereof; and wherein the fluoropolymer of the surface layer comprises a fluoroplastic comprising a perfluoroalkoxy fluoroplastic selected from the group consisting of (a) a copolymer of tetrafluoroethylene and perfluoro(propyl vinyl ether), (b) a copolymer of tetrafluoroethylene and a perfluoro(ethyl vinyl ether) and (c) a copolymer of tetrafluoroethylene and perfluoro(methyl vinyl ether).

9. The member of claim 8, wherein the polymer matrix is a vinylidene fluoride-containing fluoroelastomer cross-linked with a curing agent that is selected from a group consisting of a bisphenol compound, a diamino compound, an aminophenol compound, an amino-siloxane compound, an amino-silane, and phenol-silane compound.

10. A method for making a member comprising:

forming a composite dispersion comprising a plurality of carbon nanotubes, a vinylidene fluoride-containing polymer, an inorganic filler, a curing agent, an organic solvent and optionally a surfactant;

depositing and curing the composite dispersion on a resilient layer to form an intermediate layer, wherein the resilient layer comprises silicone rubber and is formed over a substrate, wherein the intermediate layer comprises a plurality of carbon nanotubes dispersed in a polymer matrix, and further wherein the polymer matrix is a cross-linked fluoroelastomer;

applying a perfluoroalkoxy polymer aqueous dispersion directly on the intermediate layer; and treating the applied perfluoroalkoxy polymer aqueous dispersion at a temperature of 350° C. or higher to form a surface layer on the intermediate layer, wherein the intermediate layer reduces degradation of the resilient layer during the treating of the applied perfluoroalkoxy polymer aqueous dispersion compared to the amount of degradation that would otherwise occur without the intermediate layer, wherein the inorganic fillers comprise one or more filler particles selected from the group consisting of metal oxides, silicon carbides, boron nitrides, and graphites, wherein the metal oxides are selected from the group consisting of silicon oxide, aluminum oxide, zirconium oxide, zinc oxide, tin oxide, iron oxide, magnesium oxide, manganese oxide, nickel oxide, copper oxide, antimony pentoxide, indium tin oxide, and mixtures thereof, and wherein the perfluoroalkoxy polymer is a fluoroplastic selected from the group consisting of (a) a copolymer of tetrafluoroethylene and perfluoro(propyl vinyl ether), (b) a copolymer of tetrafluoroethylene and a perfluoro(ethyl vinyl ether) and (c) a copolymer of tetrafluoroethylene and perfluoro(methyl vinyl ether).

11. The method of claim 10, wherein the plurality of carbon nanotubes is present in an amount from about 0.01 percent to about 20 percent by weight of the intermediate layer.

12. A method for making a member comprising:

forming a composite dispersion comprising a plurality of carbon nanotubes, a vinylidene fluoride-containing polymer, an inorganic filler, a curing agent, an organic solvent and optionally a surfactant;

depositing the composite dispersion on a resilient layer comprising silicone rubber, wherein the resilient layer is formed on a substrate;

applying a perfluoroalkoxy polymer aqueous dispersion directly on the deposited composite dispersion; and treating the applied perfluoroalkoxy polymer aqueous dispersion on the deposited composite dispersion at a temperature of 350° C. or higher to form an intermediate layer on the resilient layer and to form a surface layer on the formed intermediate layer, wherein the intermediate layer comprises a plurality of carbon nanotubes dispersed in a polymer matrix, and further wherein the polymer matrix is a cross-linked fluoroelastomer, wherein the composite dispersion reduces degradation of the resilient layer during the treating of the applied perfluoroalkoxy polymer aqueous dispersion compared to the amount of degradation that would otherwise occur without the composite dispersion, wherein the intermediate layer further comprises one or more filler particles comprising metal oxides, silicon carbides, boron nitrides, and graphites, wherein the metal oxides are selected from the group consisting of silicon oxide, aluminum oxide, zirconium oxide, zinc oxide, tin oxide, iron oxide, magnesium oxide, manganese oxide, nickel oxide, copper oxide, antimony pentoxide, indium tin oxide, and mixtures thereof, and wherein the perfluoroalkoxy polymer aqueous dispersion comprises a fluoroplastic selected from the group consisting of (a) a copolymer of tetrafluoroethylene and perfluoro(propyl vinyl ether), (b) a copolymer of tetrafluoroethylene and a perfluoro(ethyl vinyl ether) and (c) a copolymer of tetrafluoroethylene and perfluoro (methyl vinyl ether).

13. The method of claim 12, wherein the plurality of carbon nanotubes is present in an amount from about 0.01 percent to about 20 percent by weight of the intermediate layer.

* * * * *